(12) United States Patent
Gnech et al.

(10) Patent No.: US 9,112,864 B2
(45) Date of Patent: *Aug. 18, 2015

(54) CONTROLLING ACCESS WITHIN A PROTECTED DATA ENVIRONMENT

(71) Applicant: International Business Machines Corporation, Armonk, NY (US)

(72) Inventors: Thomas H Gnech, Boeblingen (DE); Steffen Koenig, Boeblingen (DE); Enrico Mayer, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/726,700

(22) Filed: Dec. 26, 2012

(65) Prior Publication Data

US 2013/0117860 A1 May 9, 2013

Related U.S. Application Data

(63) Continuation of application No. 12/959,718, filed on Dec. 3, 2010.

(30) Foreign Application Priority Data

Dec. 14, 2009 (EP) ..................................... 09179009

(51) Int. Cl.
*H04L 29/06* (2006.01)
*H04L 29/08* (2006.01)
*G06F 21/62* (2013.01)

(52) U.S. Cl.
CPC ............ *H04L 63/10* (2013.01); *G06F 21/6218* (2013.01); *H04L 63/0838* (2013.01); *H04L 63/102* (2013.01); *H04L 67/146* (2013.01); *H04L 63/168* (2013.01)

(58) Field of Classification Search
CPC ..... G06F 21/60; G06F 21/62; G06F 21/6209; G06F 21/6218; G06F 21/6272; G06F 2221/2117; G06F 2221/2129; G06F 2221/2141; G06F 17/30876; H04L 63/08; H04L 63/0876; H04L 63/0884; H04L 63/083; H04L 63/0838; H04L 63/10; H04L 63/101; H04L 63/102; H04L 63/105; H04L 63/108; H04L 67/146
USPC ............ 726/26–29, 4; 709/225, 229; 715/208
See application file for complete search history.

(56) References Cited

U.S. PATENT DOCUMENTS 6,675,261 B2 * 1/2004 Shandony ..................... 711/121
7,257,836 B1 * 8/2007 Moore et al. ..................... 726/5
(Continued)

OTHER PUBLICATIONS

Java Servlet Specification Version 2.4, Nov. 24, 2003, Sun Microsystems, Inc, pp. 1-330.

*Primary Examiner* — Zachary A Davis
(74) *Attorney, Agent, or Firm* — Steven Chiu

(57) ABSTRACT

User access is controlled through a computer network within a protected data environment of a computer environment. An exception list comprising an Identifier stored within the protected data environment for granting user access of an unauthorized user is defined. At least one allowed access property relation for user access is defined when accessed by the unauthorized user. An Identifier of a user access request of the unauthorized user is checked in the exception list. A One-Time Identifier is created. The One-Time Identifier is assigned to the electronic data resource according to the allowed property relation. The requested resource is delivered to the unauthorized user by using the assigned One-Time Identifier.

16 Claims, 10 Drawing Sheets

(56) References Cited

U.S. PATENT DOCUMENTS

Figure 1:
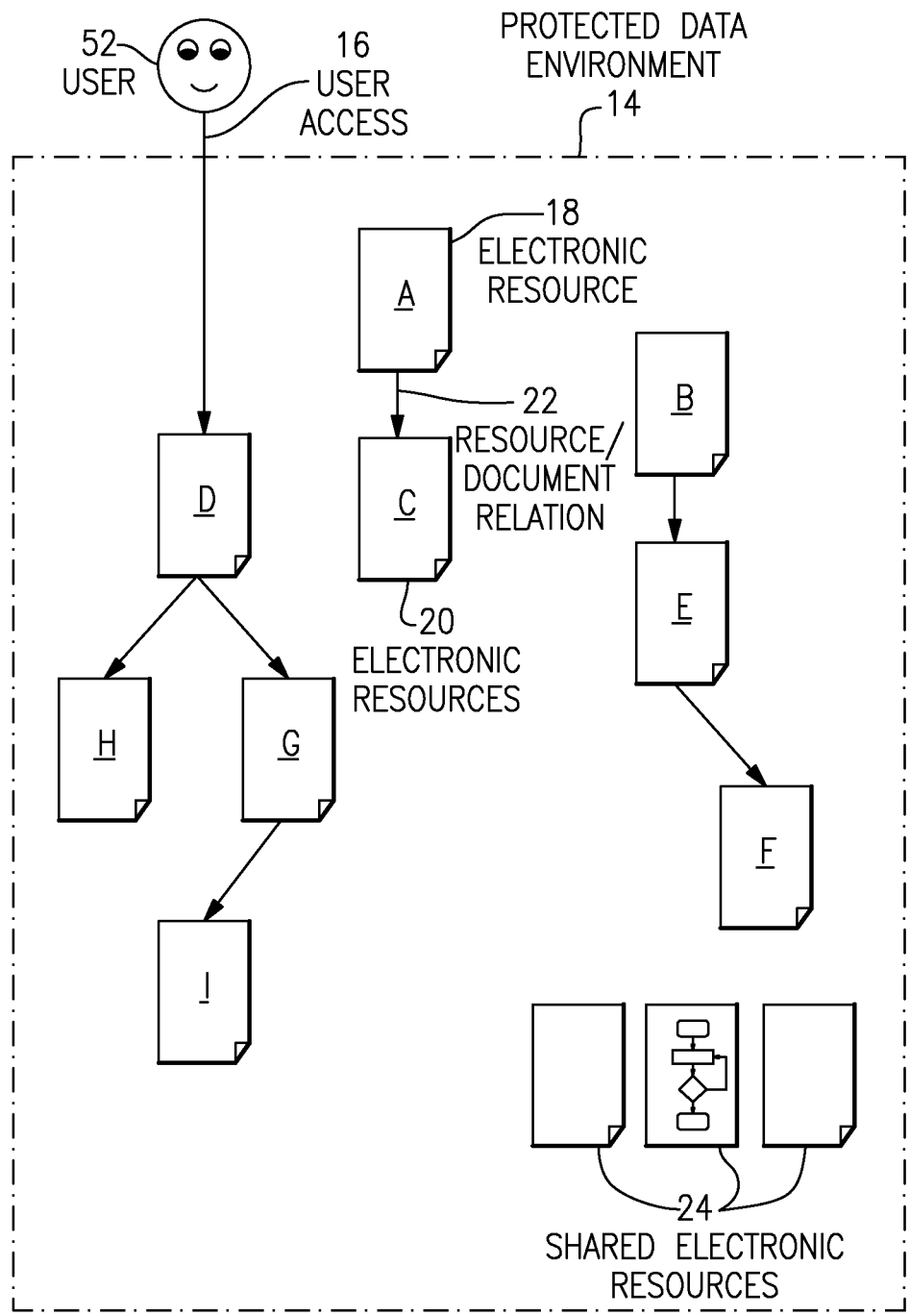

| | | | |
|---|---|---|---|
| 7,478,434 B1 * | 1/2009 | Hinton et al. | 726/27 |
| 7,636,941 B2 * | 12/2009 | Blinn et al. | 726/21 |
| 8,082,509 B2 * | 12/2011 | Orsolini et al. | 715/751 |
| 8,321,915 B1 * | 11/2012 | Bartolucci et al. | 726/4 |
| 2006/0209809 A1 * | 9/2006 | Ellingham et al. | 370/356 |
| 2010/0100935 A1 * | 4/2010 | Sato et al. | 726/3 |
| 2010/0121657 A1 * | 5/2010 | Rosenberger et al. | 705/3 |

* cited by examiner

```
<security-constraint>
  <web-resource-collection>
    <web-resource-name>restricted methods</web-resource-name>
    <url-pattern>/*</url-pattern>
    <url-pattern>/acme/wholesale/*</url-pattern>
    <url-pattern>/acme/retail/*</url-pattern>
    <http-method>GET</http-method>
    <http-method>POST</http-method>
  </web-resource-collection>
  <auth-constraint>
    <role-name>R1</role-name>
  </auth-constraint>
</security-constraint>
```

28 ELECTRONIC RESOURCE
44 ALLOWED METHODS
26 ROLE

FIG.3
Prior Art

CONTROLLING ACCESS WITHIN A PROTECTED DATA ENVIRONMENT

CROSS REFERENCE TO RELATED APPLICATIONS

This application claims priority under 35 U.S.C. 119 from European Patent Application No. 09179009.7 filed Dec. 14, 2009, the entire contents of which are incorporated herein by reference This application is a continuation of U.S. patent application Ser. No. 12/959,718 "CONTROLLING ACCESS WITHIN A PROTECTED DATA ENVIRONMENT" filed Dec. 3, 2010, the contents of which are incorporated by reference herein in their entirety.

BACKGROUND

The invention relates to a method, a computer program product and a server for controlling a user access via a computer network to at least one electronic resource stored within a protected data environment of a computer environment.

Electronic resources like software applications, databases, documents or electronic pictures stored within a software application container being accessible via a computer network are generally protected and user access requires some sort of authentication. However, such electronic resources stored within a protected and/or public data environment frequently contain information that should be available publicly, which means that access to these data should not require authentication.

In the state of the art, different techniques are well-known for providing user access to public and protected electronic resources, whereby protected resources can only be accessed by authorized users using a controlled access system. Authorization is commonly based on identification and authentication, wherein identification is a process that enables recognition of an entity by a system, and authentication is a process that verifies the identity of a user, device or other entity in a computer system, usually as a prerequisite to allow access to a resource in a computer system. In general, a realm is defined on a web or application server. Such a realm contains a collection of users, which may or may not be assigned to a group, that are controlled by the same authentication policy. A software or web application will often prompt a user to name a password for allowing access to protected resources. When the user has entered the user name and the password, the information is transmitted to the server, which either authenticates the user and sends the protected resource or fails to authenticate the user, in which case access to a protected resource is denied. Thereby, different access control strategies are well-known, which can be divided into discretionary access control (DAC), mandatory access control (MAC), multi-level/multi-lateral security methods and role-based access control (RBAC).

The DAC represents one of the most common access control strategies. This function is often referred to as identity-based access control (IBAC). An access to an electronic resource is based on the identity of the user (human user, process, system), whereby access control rights are defined individually from the user himself/herself and for each user individually. In contrast thereto, MAC grants access to electronic resources according to rules and properties of the user and the electronic resource. Therefore, the user is not capable of directly accessing an electronic resource and is required to use a reference monitor. This access control strategy is also referred to as rule-set-based access control. A multi-level security system is highly similar to a mandatory access control system and comprises several cascaded protection levels, which distinguish between a top-down and a bottom-up information flow. A multi-lateral security access model represents an enhanced access control strategy, which does not only consider top-down and bottom-up information flow, but also considers all sides of information access.

In computer system security, a role-based access control (RBAC) represents an approach to restrict system access to authorized users, which constitutes a more recent alternative approach to MAC and discretionary access control (DAC). Roles are created for various job functions defining electronic resource access properties, thus certain operations are assigned to specific roles. Groups of users are assigned to particular roles and those role assignments require the permission to perform particular system functions. Since users are not assigned permissions directly, but only acquire them by means of their role, management of individual user rights can be performed centrally, whereby references from one electronic resource to another one are handled by a role mechanism.

Figure 2:
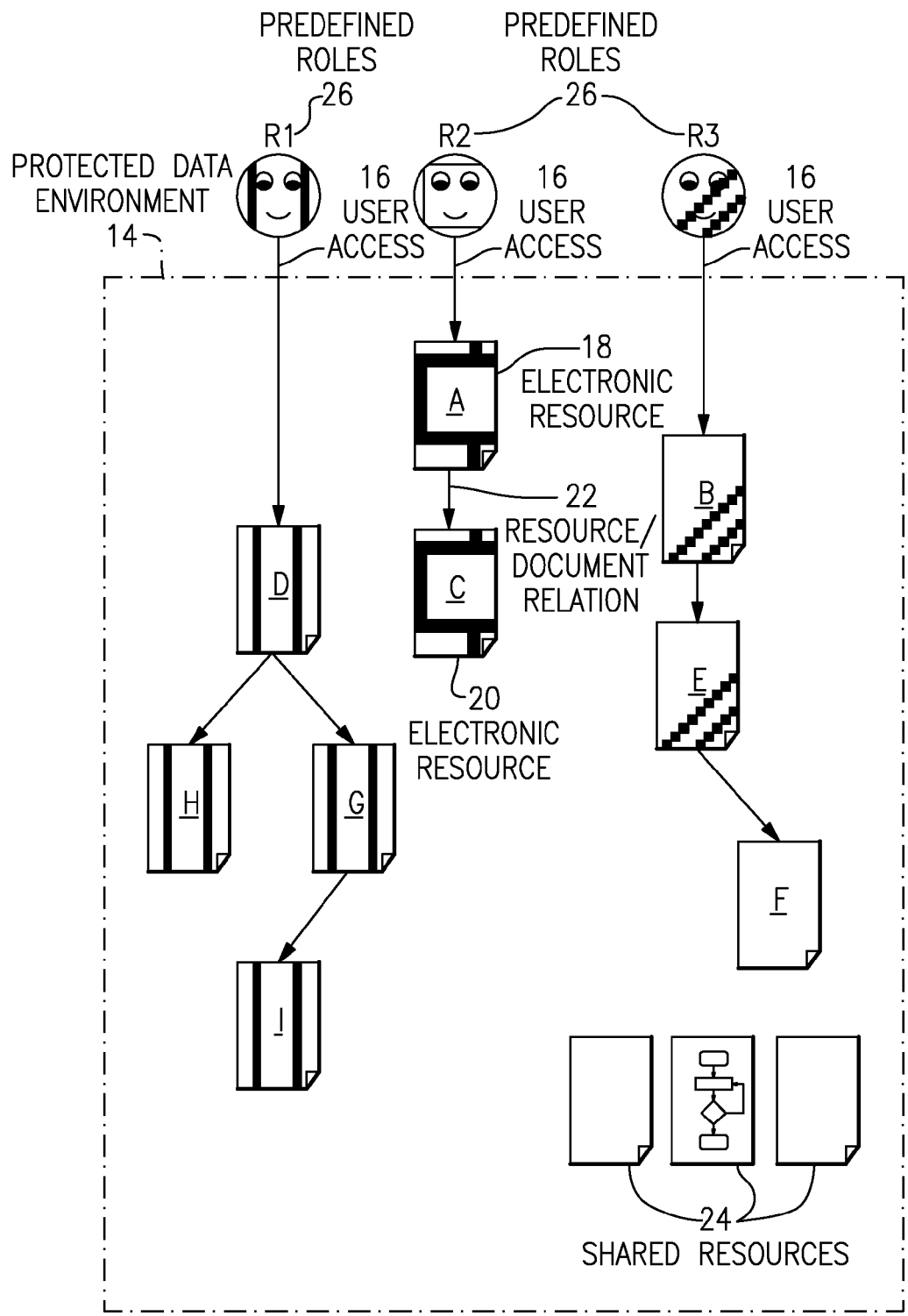

According to the example shown in FIG. 2, three roles "R1", "R2" and "R3" are depicted, whereby each role allows access to certain documents of a web application. A user being assigned to role "R1" has access to documents D, H, G and I. A user assigned to role "R2" has access to documents A and C and an "R3" user has access to documents B, E and F. All of said three roles "R1", "R2" and "R3" are capable of accessing shared resources 24, which can be public electronic documents, such as help menus, setting menus, public scripts and other software services. Consequently, all of the documents share certain resources 24 (images, scripts, HTML markup), whereby references 22 (links from one document to another one) will be handled by the role mechanism as usual.

Furthermore, a resource protection as specified in Sun's Servlet Specification 2.4/2.5, incorporated herein by reference, comprises the definition of security constraints as a declarative way to protect web content. Such security constraints allow for the definition of certain address ranges for accessing electronic resources, extension patterns of type of resource data and access methods for defining access actions applied to the addressed electronic resource. FIG. 3 exemplarily illustrates the definition of a security constraint of a web resource for addressing the URL pattern "/*", "/acme/wholesale/*" and "/acme/retail/*". Within these address ranges, documents can be accessed for displaying images, html web pages and executing Java-scripts. Thereby distinct access actions "get" and "post" as http-methods can be applied on these electronic resources. This security constraint is defined under a role, which is referred to as role "R1". The drawback of such a fixed security constraint definition resides in the aspect that URL patterns and extension patterns cannot be combined and security constraints cannot be changed dynamically.

The drawback of such role-based access control resides in the aspect that all users have to be authenticated. An ad-hoc resource access authorization for non-authenticated users is not possible with the role-based approach, since links and extensions as defined for instance in Sun's Servlet Specification 2.4/2.5 do not allow a change of navigation structure and resource location of the web application during run-time. Therefore, a modified resource access authorization requires a restart of the web application in order to adapt the role mechanism to modified access roles.

A well known mechanism for providing indirect access to a protected electronic resource is the use of One-Time Uniform Resource Identifiers, preferably One-Time Uniform Resource Locators (OTU), which are only valid for a certain period of time or for a single access request to an associated electronic resource within a computer environment. One-Time URLs are generated using single secure hash algorithms or algorithms incorporating session and user information or other methods that provide an unique temporary identifier for an electronic resource. Usually, One-Time URLs (OTU) are used in online stores, portal applications, web-based information systems and search engines to provide access to temporarily valid electronic resources like web resources, personal information and data as well as to e-mail addresses, web links, electronic documents, such as PDF-documents, JPG-pictures etc. Furthermore, OTUs are used to mask real URLs of a web application to prevent unauthorized linking of content.

In conclusion, the above-mentioned state of the art fails to offer an access to electronic resources stored within a protected environment to the public by leaving it in the protected area, i.e. neither moving it into the public area nor duplicating the information in the public area. Additionally, all resources (protected or unprotected) referenced shall also be publicly accessible without explicit authentication and only within the scope of the request. Thereby, a temporary resource authorization may not comprise the declared security constraints of the web application container and therefore has to limit the access of the non-authenticated user to the publicly-made resource by disabling links and resource references leading from the electronic resource to protected or non-authorized parts of the data application container.

Considering FIG. 1, it is highly desirable that a non-authorized user 52 should be allowed to access a document D residing in a protected area 14 of a web application container of a web application server, without the need to relocate or copy the accessed electronic resource D to a non-protected area of the web application container. Additionally, all of the shared resources 24 associated with electronic resource D being needed to render the electronic resource correctly should also be automatically accessible within the scope of the user access request 16. Furthermore, it should be possible to selectively authorize access to another electronic resource H, G or I referenced from electronic resource D.

BRIEF SUMMARY

It is an object of the invention to provide information available to the public by leaving it within a protected area of a computer environment, i.e. neither moving nor duplicating the same into some public area of the computer environment. Besides, all resources (protected or unprotected) referenced by this public information should also be publicly accessible without explicit authentication and only within the scope of the request. As such, the invention allows a non-authenticated web application user to access an electronic resource residing in a protected area of a web application and to access at least some shared resources being needed to render the document correctly and furthermore to selectively authorize electronic resource references from an accessed electronic resource to another referenced electronic resource.

These objects are achieved by the features of the independent claims. The other claims and the specification disclose advantageous embodiments of the invention.

A resource access control method for controlling a user access via a computer network to at least one electronic resource stored within a protected data environment is proposed, comprising the following steps:

defining an exception list comprising at least a Uniform Resource Identifier (URI), preferably a Uniform Resource Locator (URL) of said electronic resource stored within said protected data environment for granting user access of an unauthorized user to said electronic resource; defining at least an allowed access property relation for user access to said electronic resource when accessed by said unauthorized user; checking a URI of a user access request of unauthorized user to an electronic resource with a corresponding entry in the exception list; creating a One-Time URI, preferably a One-Time URL (OTU) and assigning said One-Time URI to said electronic data resource according to said allowed property relation; delivering the requested electronic resource to the unauthorized user by using the assigned One-Time URI.

According to the present invention, a resource access control method is proposed for controlling an access of a non-authenticated user to an electronic resource, preferably an HTML, Word, Excel, Power Point, or PDF document or a BMP, JPG, TIF, GIF picture or the like stored within a protected data environment of a computer network, e.g. a web application container embedded in a web application server. The inventive method proposes to define an exception list comprising a Uniform Resource Identifier, i.e. a link to such protected electronic resources and to define at least one access property relation for a non-authenticated user access to said electronic resource comprised by the exception list, so that when a non-authenticated user requests access to said electronic resource a URI of the user access request is checked against the Uniform Resource Identifiers comprised by the exception list, and when access is granted to any of said electronic resources comprised by the exception list, a One-Time URI is created and assigned to said electronic data resource according to said allowed property relation, such that the requested electronic resource comprising said One-Time URI is delivered to the non-authorized user. Therefore it is proposed to define an exception list that contains the URI (URL) of a document that should be publicly available for non-authorized users. Also some sort of cascading depth restriction or predecessor-successor restriction to related documents and shared electronic resources can be provided for a non-authenticated user access, thus limiting the navigation path to the electronic resource to predefined electronic resources within the protected data environment and to automatically authorized associated resources for rendering of the document/electronic resource.

According to a favorable embodiment of the present invention, said computer network is an intranet, a local area network (LAN), a wide area network (WAN) or the internet, also referred to as the web. In such a way, the inventive method can be applied to closed private networks and can also be applied to the world wide accessible internet system. Thus, the applicability of the inventive method is not limited to a specific type of computer network.

According to another favorable embodiment of the inventive method, said protected data environment is located in a web application container and is comprised by a web application server. In general, said protected data environment can be located in any kind of electronic database. Especially, in an internet environment (web environment) usually web application containers are used to provide electronic resources and documents to web users. Such web application containers are usually comprised by a web application server providing access logic and software resources for rendering and delivering electronic resources and documents to web users.

According to another favorable embodiment of the inventive method, an allowed user access is restricted by an authorized drill-down depth restriction of electronic resource access. Such an authorized drill-down depth restriction controls access depth to linked electronic resources and documents of said accessed electronic resources and prevents an unauthorized user to access other documents than said electronic resource comprised by the scope of the drill-down depth restriction. Such a drill-down depth restriction can limit access to other than directly referenced electronic resources, or limit access to only two or three reference levels. In such a way, an efficient access restriction is provided, limiting access of an unauthorized user to the addressed electronic resource defined in the exception list, so that electronic resources and documents which do not fall in the drill-down depth restriction cannot be accessed by the public.

Using the above-mentioned authorized drill-down depth restriction, it is highly favorable that the drill-down depth restriction follows a cascading-depth restriction method and/or a predecessor-successor restriction method. Thereby a reference level defines a logical reference distance between electronic resources A and B. If B is directly linked to A then the reference level is 1. If B is indirectly linked to A via electronic resource C, the reference level is 2 and so forth.

The cascading-depth method is a method to instantly authorize access to protected documents and their associated resources for non-authenticated users by applying the proposed cascading-depth algorithm in combination with One-Time URLs and an exception list. The implementation of the proposed cascading-depth algorithm ensures continued availability of the application server by avoiding declarative changes to a security policy or security constraints definition which usually forces an application server restart in state of the art implementations. A cascading-depth restriction method limits a single or multiple reference paths from an accessed document or electronic resource to other non-publicly available resources and documents until a predefined reference level is reached and automatically authorizes associated resources to render said electronic resources and documents within the scope of the allowed reference level. Thereby, it is not allowed to follow a reference from the referenced document to a document or resource being referenced outside of the allowed reference level.

On the other hand a predecessor-successor restriction method allows a single reference chain to be referenced until a certain number of reference levels are reached. The predecessor-successor method instantly authorizes access to protected documents and their associated resources for non-authenticated users by applying the predecessor-successor algorithm in combination with One-Time URLs and an exception list. The implementation of the proposed predecessor-successor algorithm ensures continued availability of the application server by avoiding declarative changes to a security policy or security constraints definition which usually forces an application server restart in state-of-the art implementations. For example an addressed electronic resource D references document G, and document G references document H. Starting from D a predecessor-successor relation allows access to G but does not allow access to H. As such, a predecessor-successor restriction method allows a linear chain of references to be followed, whereby a cascading-depth method allows multiple references to be followed until a certain depth of reference levels is reached. Providing cascading-depths or predecessor-successor restriction methods allows efficient control to access from an addressed electronic resource to referenced electronic resources and guarantees that unreferenced resources in the protected area are left alone, so that unauthorized users cannot access other documents besides the referenced documents allowed by the drill-down depth restriction.

According to another favorable embodiment of the invention, said access property relation comprises at least one allowed access method, preferably at least one http-method "get", "head", "post", "put", "delete", "trace", "connect" or "options". Such read/write access methods allow for the definition of the type of access of a user to an electronic resource and allow for the application of modification actions to the electronic resource such as reading, writing, deleting, moving or changing the type of electronic resource. The "options"-method represents a request for information about the communication options available on the request/response chain identified by the request URI. The "get"-method means retrieving whatever information is identified by the request URI. The "head"-method is identical to the get-method except for that most servers must not return a message body in the response. The "post"-method can cover functions like posting a message or annotating a resource. The "put"-method requests the enclosed entity to be stored under the supplied request URI. The "delete"-method requests that the origin server deletes the resource identified by the request URI. The "trace"-method is used to invoke a remote application layer loop-back of the request message. The "connect"-method is reserved for use with a proxy that can be dynamically switched to being a tunnel. Defining an allowed access method according to the above-given list or any other access regulating method allows for the determination of the scope of modification of an unauthorized user access to the addressed electronic resource and referenced resources.

According to another favorable embodiment of the present invention, creating and assigning a One-Time URI comprises creating and assigning of a One-Time URI to at least one referenced document URI, preferably one referenced web page, text or image URI of said electronic resource. An electronic resource, especially an electronic document can comprise single or multiple references in the form of Uniform Resource Identifiers or Uniform Resource Locators (URI, URL) which address other electronic resources or documents. By creating and assigning a One-Time URI which replaces the original URI within the accessed electronic resource, a protected data access can be limited to a one time access or to an access within a certain time-span. In this way, at least one, preferably all URIs addressing referenced documents are replaced by One-Time URIs, so that an unauthorized user does not get access to actual URIs and does only retrieve One-Time URIs granting one time access to resources and documents stored in the protected part of the computer environment. Thereby validity of a One-Time URI useable for a one time access can also be restricted for an access use within a specified time-span, thus granting access for a predefined access-lifetime. Furthermore a One-Time URI useable within a certain time-span can be used once or can be used multiple times within said time-span, although a mixed use of One-Time URIs for one time access and One-Time URIs for multiple access within a certain time-span can be provided.

Additionally or alternatively to the aforementioned embodiment, it is highly recommendable to create and assign One-Time URIs giving access to at least one referenced software resource URI, preferably to at least one referenced servlet resource of said electronic resource. In such a way, not only documents but also software resources can be addressed by One-Time URIs, such that unauthorized users can use software resource functionality, preferably Java-servlet functionality, only within the scope of a single access.

Additionally and also alternatively to the aforementioned embodiments, it is highly recommendable that the step of creating and assigning a One-Time URI comprises creating and assigning of a One-Time URI to at least one referenced e-mail URI of said electronic resource. In such a way, also enclosed e-mail addresses embedded within the accessed electronic resource are replaced by One-Time URIs providing the unauthorized user with a One-Time usable e-mail address thus hiding the actual e-mail address embedded in the electronic resource. In such a way, at least parts of referenced documents, software pieces or e-mail addresses can be protected efficiently from uncontrolled access by using One-Time URIs limiting non authorized access to a one time validity of delivered URIs. A selective use of One-Time URIs enhances access security and protects permanent resource access from unauthorized user access.

According to another favorable embodiment of the present invention, at least one One-Time URI is only valid for a one time access or a temporally limited user access. A One-Time URI can in this way be used for a One-Time access, such that a second use of such One-Time URI would lead to an access denial or a One-Time URI can be defined as temporal limited URI, such that a One-Time URI can be used multiple times within a predefined time span, for instance ten minutes, or until a certain event takes place, for instance an execution time of a servlet.

According to another aspect of the invention, a computer program product is provided comprising a computer usable medium including a computer usable program code for controlling a user access via a computer network to at least one electronic resource stored within a protected data environment, wherein the computer usable program code comprising:

computer usable program code for defining an exception list comprising at least one Uniform Resource Identifier (URI), preferably a Uniform Resource Locator (URL) of said electronic resource stored within said protected data environment for granting user access of an unauthorized user to said electronic resource; computer usable program code for defining at least one allowed access property relation for user access to said electronic resource when accessed by said unauthorized user; computer usable program code for checking a URI of a user access request of an unauthorized user to an electronic resource with a corresponding entry in the exception list; computer usable program code for creating a One-Time URI, preferably a One-Time URL (OTU) and assigning said One-Time URI to said electronic data resource according to said allowed access property relation; and computer usable program code for delivering the requested electronic resource to the unauthorized user by using the defined One-Time URI.

In other words, a second object of the invention proposes a computer program product comprising a computer useable medium, such as a CD, DVD, memory stick, diskette, internet downloadable file or similar computer usable media, which includes a computer usable program code, i.e. software, for controlling a user access via a computer network to at least one electronic resource stored within a protected data environment, preferably a user access via internet to a web application container comprised in a web application server, wherein the computer usable program code is designed to execute an embodiment of the above described inventive method. For executing said method the software comprises computer code for defining an exception list in which the URIs of at least one protected electronic resource for which an unauthorized user access shall be granted is listed. Also, preferably within the exception list, an allowed access property relation is defined for at least an access to said electronic resource defining the type of access action which can be performed by the unauthorized user (read/write/modify operation). Furthermore the computer product comprises software portions for checking a requested URI of an unauthorized user access against URIs being listed in the exception list, and in the case of matching URIs some software portion creates a One-Time URI, which grants access to the requested electronic resource. Preferably, within a nested algorithm URIs of said electronic resource referencing to other electronic resources and documents are also replaced by such One-Time URIs following a drill-down depth restriction method. Finally the computer program product comprises program code portions for delivering the requested electronic resource to the unauthorized user by using the One-Time URI, such that the unauthorized user can only identify and retrieve the addressed electronic resource with the help of the One-Time URI. As such, the unauthorized user does not retrieve further information about the location of the electronic resource and access is granted only once.

According to another aspect of the invention, a server is provided within a computer environment for controlling a user access via a computer network to at least one electronic resource stored within a protected data environment of a computer environment, whereby the server comprises:

an exception list means for defining an exception list of Uniform Resource Identifiers (URI), preferably Uniform Resource Locators (URL) of said electronic resource stored within said protected data environment for granting user access of an unauthorized user to said electronic resource; an access property relation means for defining at least one allowed access property relation for user access to said electronic resource when accessed by said unauthorized user; a request checking means for checking a URI of a user access request of an unauthorized user to an electronic resource with a corresponding entry in the exception list; a One-Time URI creating means for creating a One-Time URI, preferably a One-Time URL (OTU) and assigning said One-Time URI to said electronic resource according to said allowed access property relation; and a resource delivering means for delivering the requested said electronic resource to the unauthorized user by using the defined One-Time URI.

According to the third aspect of the invention, a server is provided, which can be a software-based server or a hardware-based server on which a computer program according to the second aspect of the invention can be executed. Hence the server is embedded in a computer network environment and controls the access of a user to at least one electronic resource stored within a protected data environment, whereby the server comprises an exception list means for defining and storing of an exception list of publicly accessible electronic resources, an access property relation means for defining and assigning access property relations to said electronic resource, which means read/modify/write attributes, a request checking means for checking if a URI request of a unauthorized user equals a URI comprised by the exception list and a One-Time URI creating means for creating a One-Time URI which is assigned to said addressed electronic resource if an access is granted, whereby a resource delivering means delivers the addressed electronic resource to the user by using the defined One-Time URI. In such a way, a software implemented server or a hardware implemented server is configured to execute the invention.

According to a favorable embodiment of the inventive server, said server is a web application server, said computer environment is a computer network environment, preferably an internet environment and said protected data environment is comprised by a web application container of said web application server. A web application server provides a web application framework which is a software or hardware framework that is designed to support the development of dynamic web sites and provides electronic resources and other web applications and web services to the network users.

The framework aims to alleviate the overhead associated with web content management and access control activities to electronic resources stored in the web application server. For example many servers provide libraries for data access, templating frameworks and session management and often promote code reuse. Many web application servers create a unified API (Application Protocol Interface) to a database backend, referred to as a web application container enabling a web application to work with a variety of databases with no code changes, and allowing programmers to work with higher level concepts. Thereby, web application servers usually provide a URL mapping facility which is a mechanism by which the server interprets URLs. Some servers match the provided URL against predetermined patterns using regular expressions, while others use URL rewriting to translate the provided URL into one that the underlying engine will recognize. Such a mechanism of URL mapping can be used to provide One-Time URL mapping to real URLs for implementing the aforementioned access control method.

According to another favorable embodiment of the invention, the server comprises at least one software component, preferably at least one servlet, particularly at least one Java-based servlet or any other server side programming language, including software portions for implementing an embodiment of the inventive method discussed above when said servlet is executed on said server. In this way, such servlet can provide a hardware independent software portion for executing an embodiment of the inventive method for controlling access of an unauthorized user to an electronic resource stored in a protected data environment.

BRIEF DESCRIPTION OF THE OF THE SEVERAL VIEWS OF THE DRAWINGS

Figure 4:
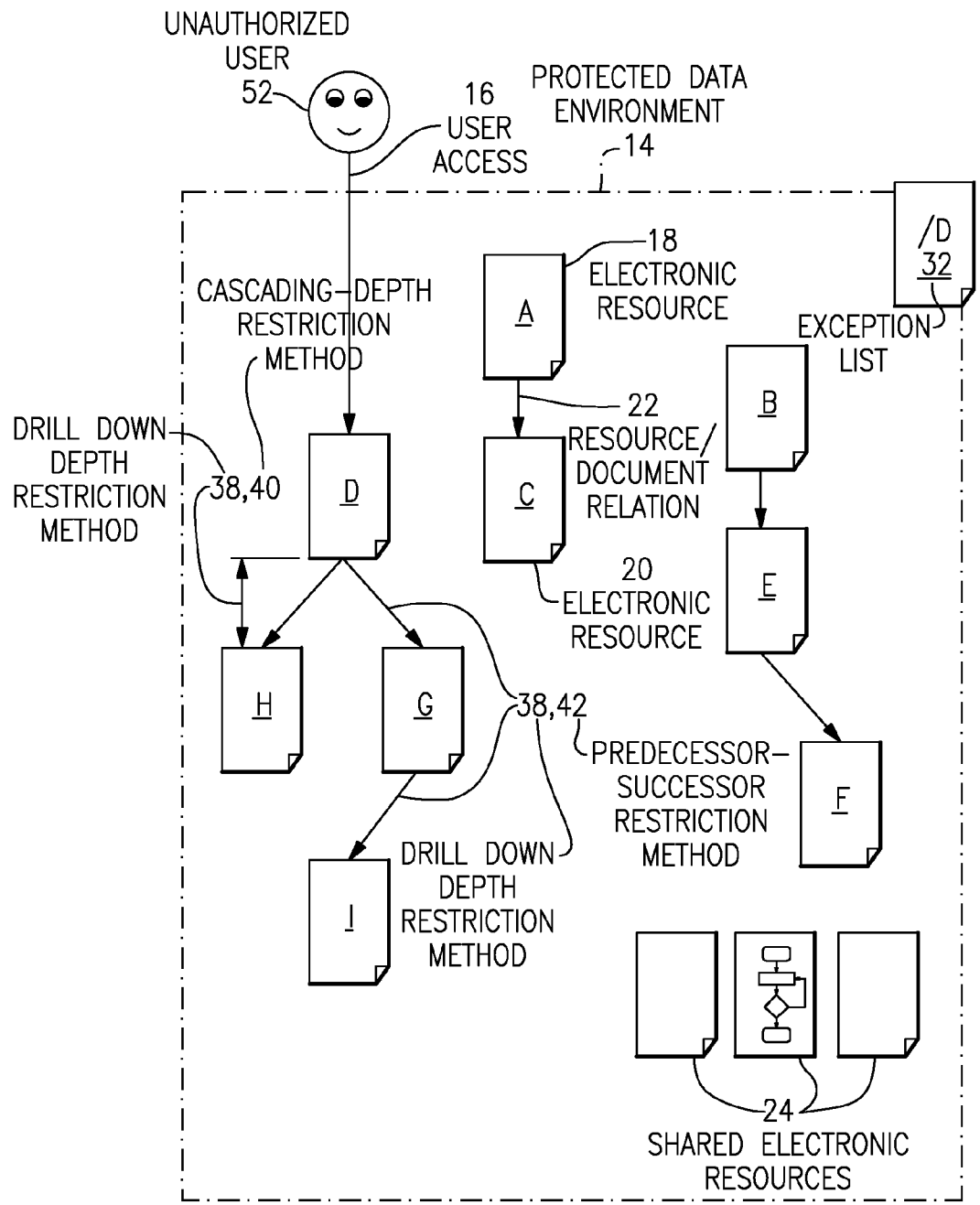
Figure 5:
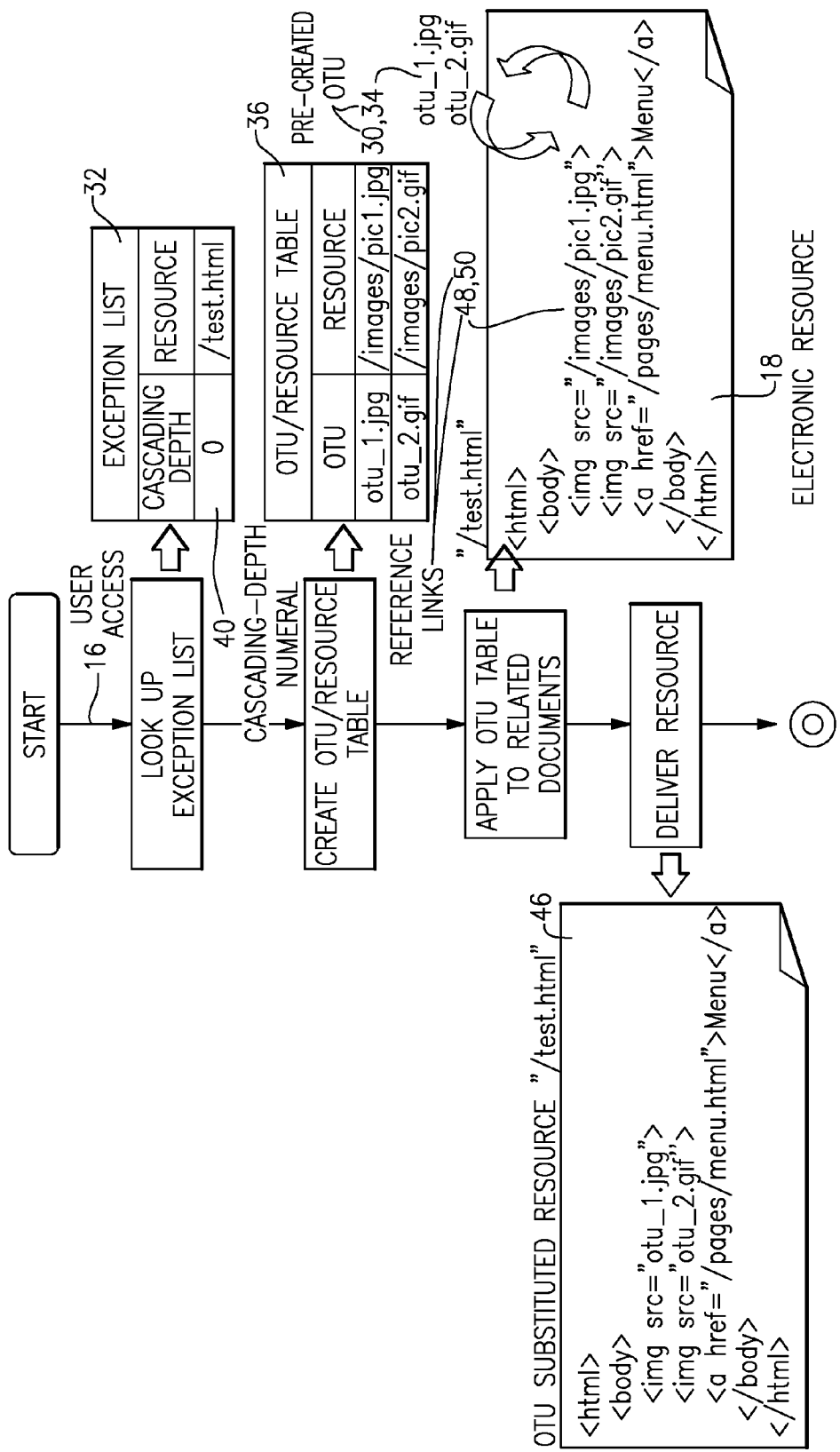
Figure 6:
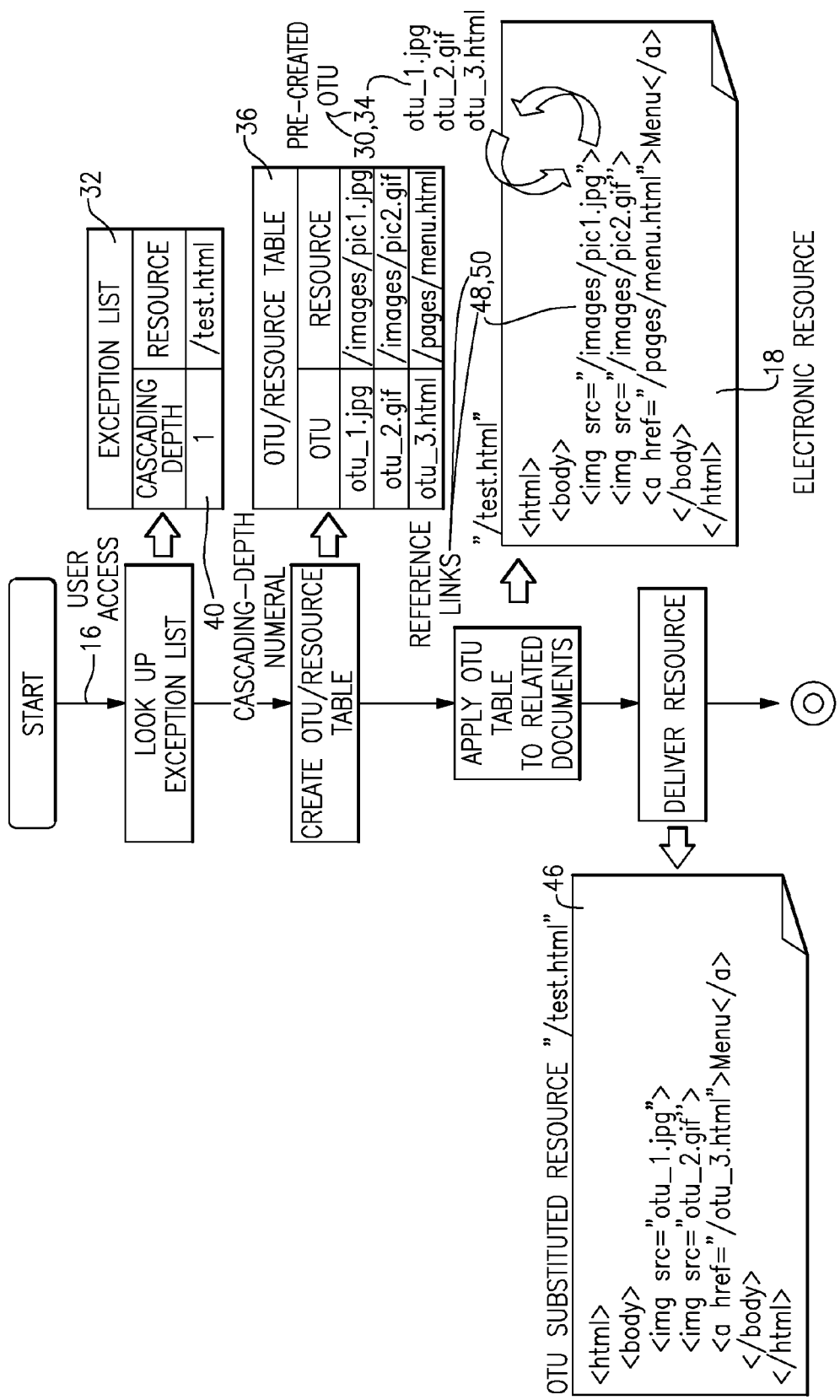
Figure 7:
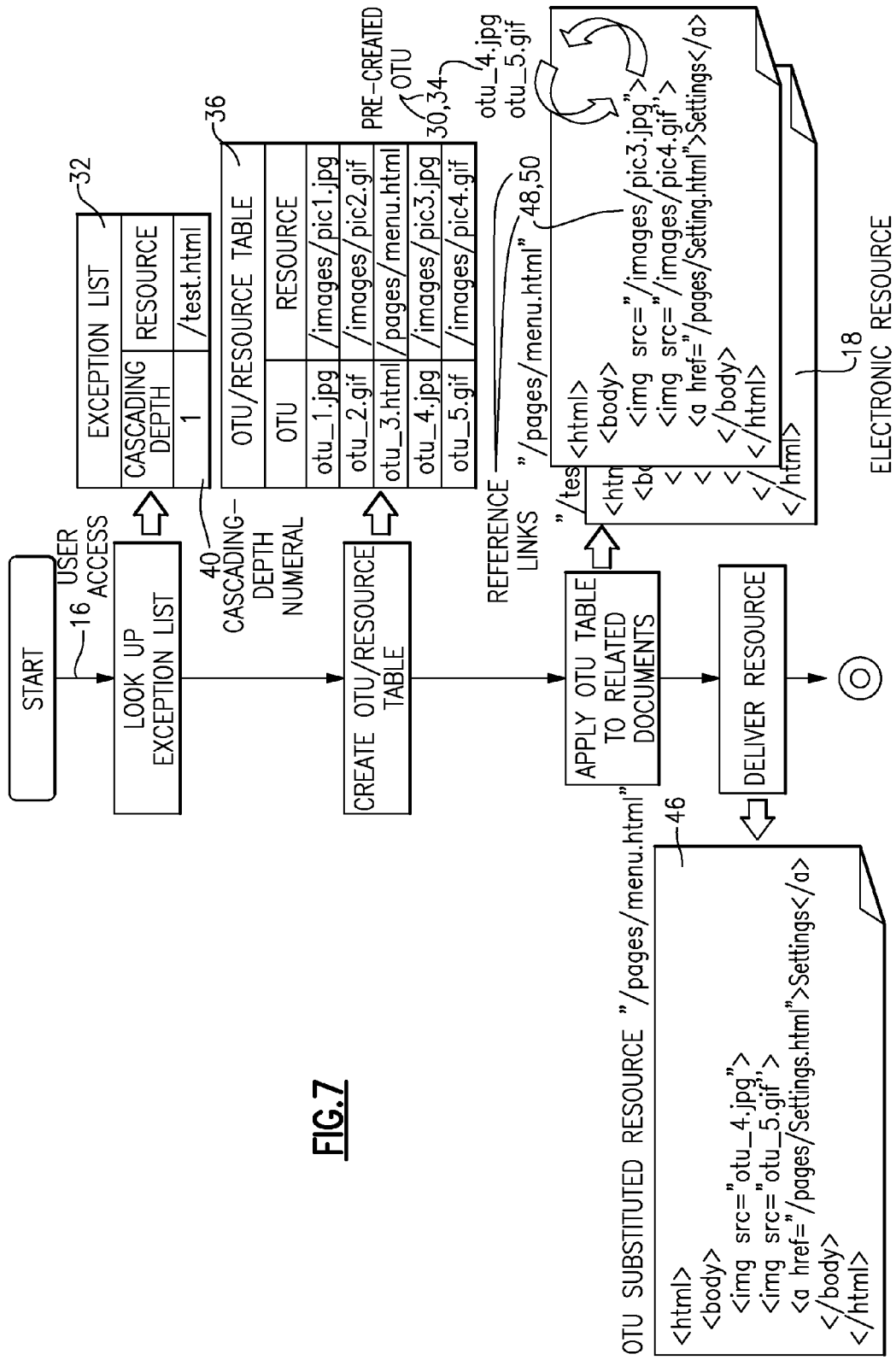
Figure 8:
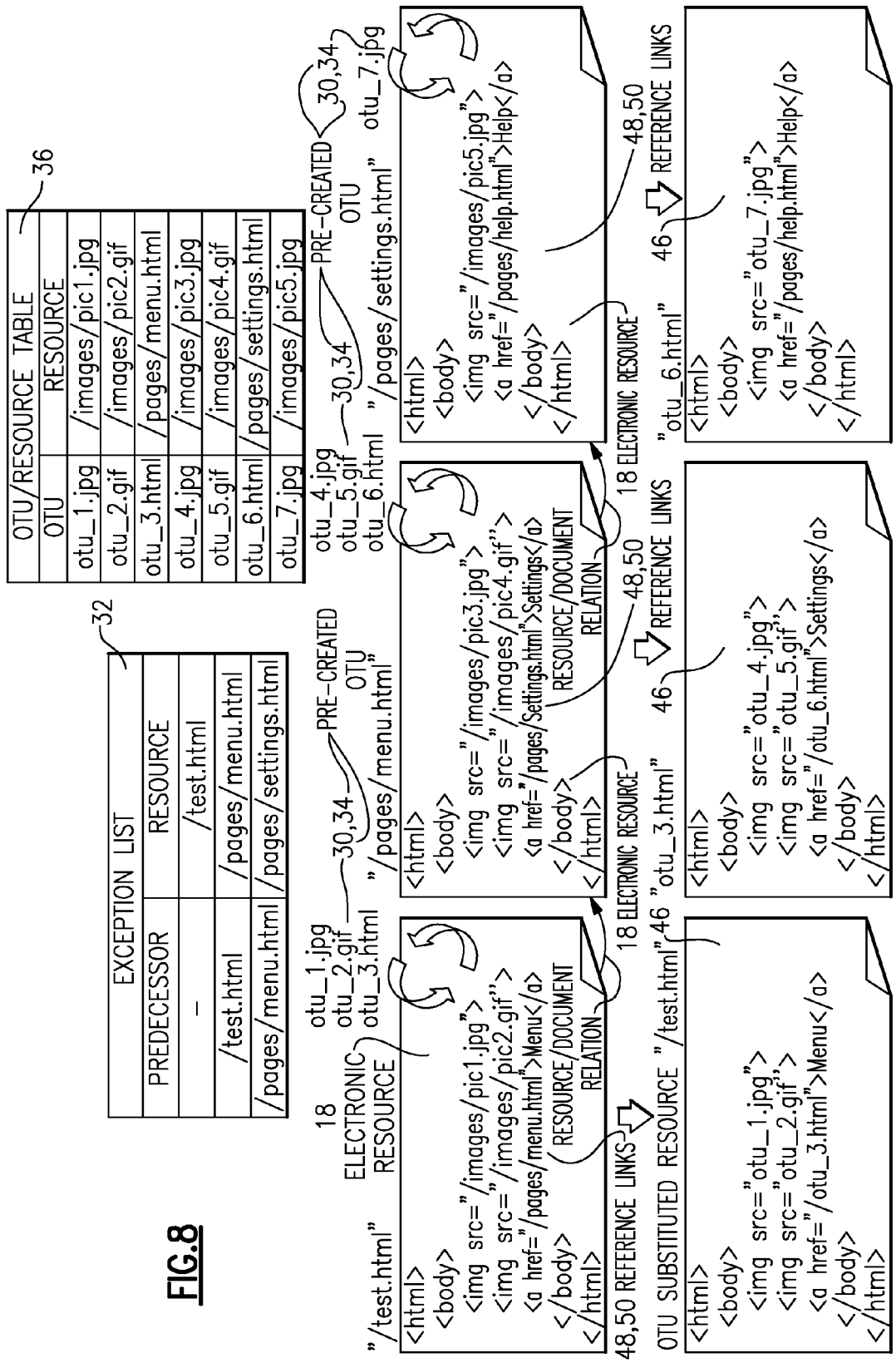
Figure 9:
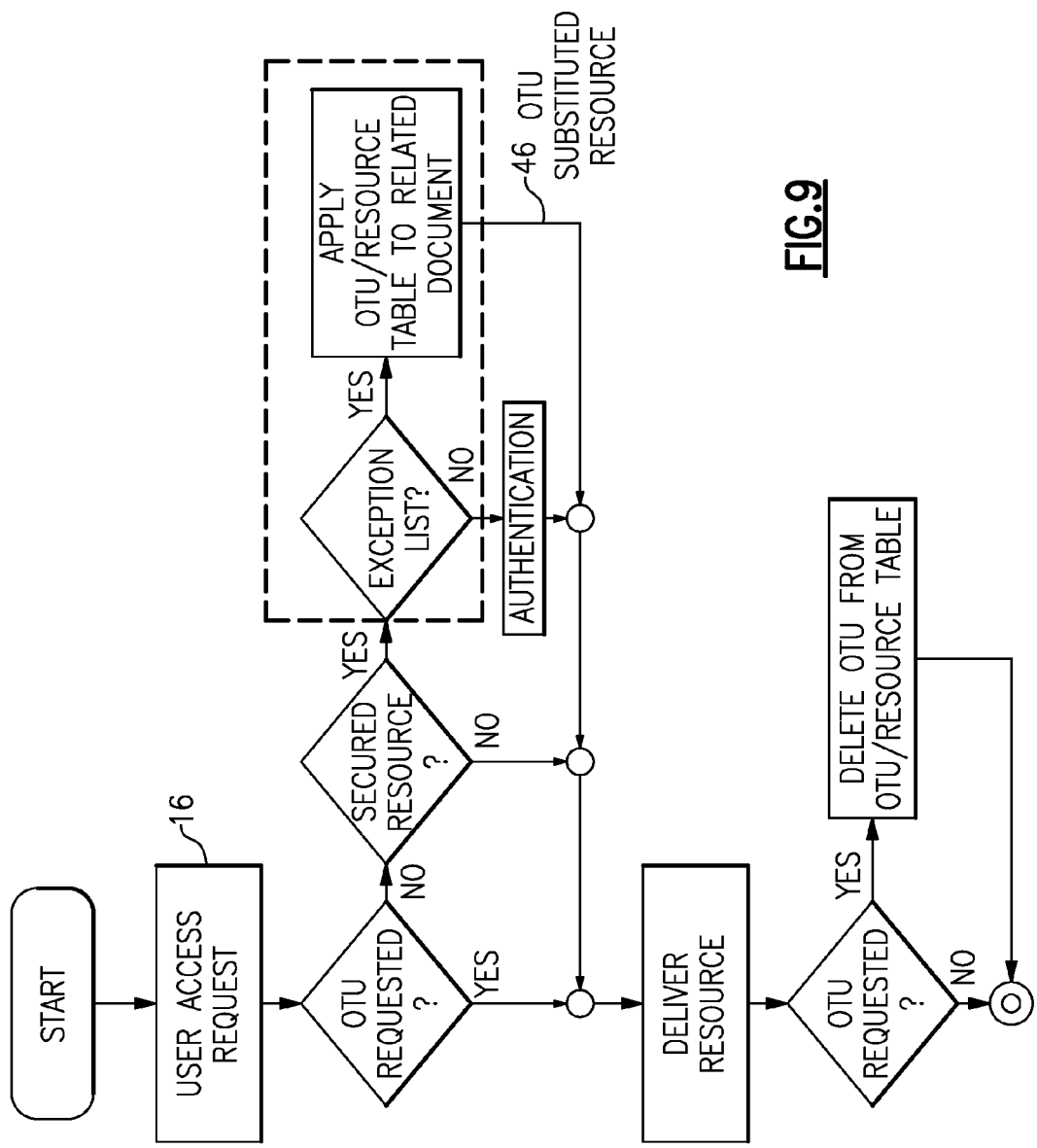

The present invention together with the above-mentioned and other objects and advantages may best be understood from the following detailed description of the embodiments, but not restricted to the embodiments, wherein is shown in:

FIG. 1 a schematic representation of a user access to an electronic resource stored in a protected data environment;

FIG. 2 a schematic representation of a role-based access to an electronic resource stored in a protected data environment;

FIG. 3 an XML software portion defining a role-based user access method;

FIG. 4 a schematic representation of an unauthorized user access to an electronic resource stored in a protected data environment controlled by a drill-down depth restriction method;

FIG. 5 a flow chart of a first embodiment of the inventive method;

FIG. 6 a flow chart of a first step of a second embodiment of the inventive method;

FIG. 7 a flow chart of a second step of a second embodiment of the inventive method;

FIG. 8 a schematic representation of electronic resource modifications according to the third embodiment;

FIG. 9 a flow chart of a fourth embodiment of the inventive method; and

Figure 10:
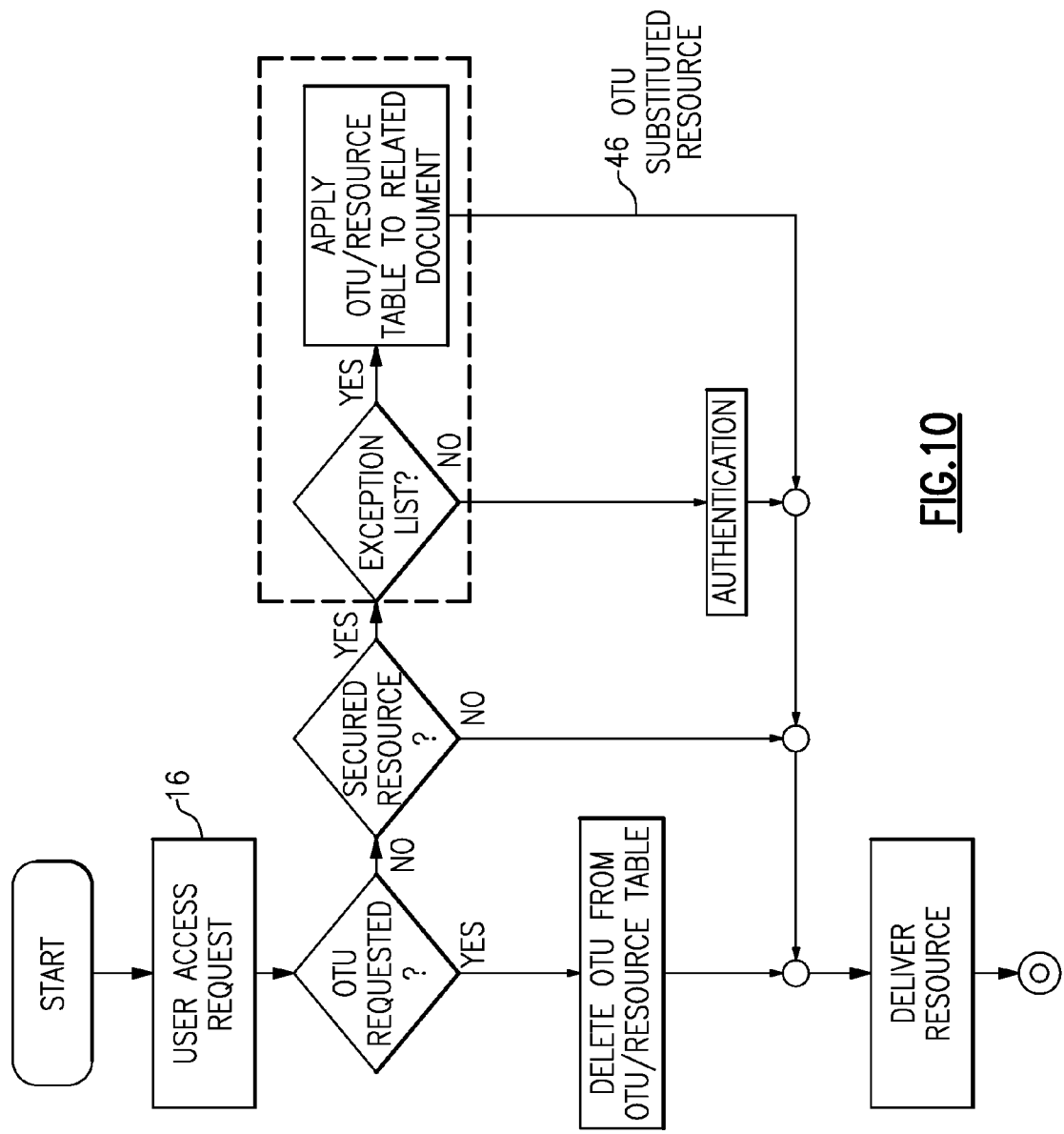

FIG. 10 a flow chart of a fifth embodiment of the inventive method.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A preferred hardware implemented server suitable for storing and/or executing program code following an embodiment of the inventive method will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O-devices (including, but not limited to keyboards, displays, pointing devices, etc.) can be coupled to the server either directly or through intervening I/O controllers. Network adapters may also be coupled to the server to enable data processing systems, remote printers, or storage devices, through intervening private or public networks. Modems, cable modem and Ethernet cards are just a few of the currently available types of network adapters.

In the preferred hardware implemented server an embodiment of an access control method for granting access to an electronic resource stored in a protected data environment to an unauthorized user can be performed. The software instructions for performing the access control method can be stored in the internal memory elements. Alternatively, external memory elements can be coupled to the system and the processor, respectively.

FIG. 1 depicts a user access 16 of a user 52 to an electronic resource D 18 stored within a protected data environment 14 of a web application container of a web application server. In the protected data environment 14, several electronic resources 18 and also shared electronic resources 24 are stored. The shared electronic resources 24 can comprise html documents and other resources used for rendering of the content of the electronic resources 18 or servlets, such as Java-scripts or other software portions being used for rendering and likewise for collecting, processing, preparing, modifying, formatting and representing of electronic data of the electronic resources 18. Electronic resources 18 can refer to other electronic resources 20 by a resource/document relation 22 (a resource link). Thereby, electronic resources 18 can reference to multiple other electronic resources 20 on the same reference level, for example electronic resource D references electronic resource H and G on the same reference level, but also can refer in a single chain linkage way to single resources on different reference levels, for example electronic resource B is linked to electronic resource E and electronic resource E is linked to electronic resource F. If user 52 accesses an electronic resource D with a user access 16, electronic resource D is multiply linked to the electronic resources H and G, whereby electronic resource G is also singly linked to electronic resource I.

Within this scenario it is unclear, if user 52 accessing electronic resource D is also allowed to indirectly access electronic resources H, G and I. Therefore, the need for a resource access control arises, which controls if a user access 16 to a specified electronic resource is granted and if he/she is also allowed to have access to electronic resources being referenced by the specified electronic resource until a predefined cascading-depth of reference linkage is reached. Thus an unauthenticated web application user 52 should be allowed to access document D residing in the protected area 14 of a web application without the need to relocate or copy the access document to a non-protected area of the web application. Additionally, all shared resources 24 associated with document D that are needed to render the document correctly should also be automatically accessible within the scope of the request. Furthermore, it should be possible to selectively authorize document references from document D to other documents H, G and I.

FIG. 2 illustrates a state-of-the-art resource access control method using role models. Thereby, users granting access to electronic resources stored in a protected data environment 14 of a web application container comprised by a web application server are assigned to predefined roles "R1", "R2" and "R3" 26. In this example, role "R1" grants access to electronic resources D, H, G and I, role "R2" allows access to electronic resources A and C and "R3" granting access to linked resources B, E and F. Each role allows access to certain documents of the web application and defines certain access properties, such that for example role "R1" has "read", "write" and also "delete" rights to its electronic resources D, H, G and I, "R2" has only "read" rights of the content of its electronic resources A and C and "R3" has unlimited rights to the electronic resources B, E and F. Each role allows for the use of shared resources 24 for rendering data of its electronic resources, whereby software portions, which can be images, scripts or the like, for creating, formatting and representing of data of the electronic resources. References (resource links) 22 from one document to another will be handled by the role mechanisms as usual. In order to enable this kind of role-based resource access authorization, each user has to be assigned to a certain role model. An ad-hoc resource access authorization leaving the navigation structure and resource location of the web application untouched for non-authenticated users is not possible with the role-based approach using a URL and extension patterns as defined in Sun's Servlet Specification 2.4/2.5.

FIG. 3 shows a software portion of an XML document specifying a resource protection as specified in Sun's Servlet Specification 2.4/2.5. Thereby, a security constraint is defined for a role "R1" 26 in a declarative way to protect an electronic resource 28 located in path "/*", "/acme/wholesale/*" and "/acme/retail/*", whereby an access is granted to all electronic resources and documents having a URL pattern "/*", "/acme/wholesale/*" and "/acme/retail/*". The allowed methods 44 for accessing these electronic resources are "get" and "post", allowing users to read the content of the electronic resource (get) and to post amendments into the electronic resource (post). In this way, the displayed XML-portion provides an access control definition for accessing protected electronic resources by a role-based access method. The drawback of such a predefined user resource access control resides in the aspect that URL patterns and extension patterns cannot be combined. Security constraints cannot be changed dynamically and access of an unauthorized user cannot be granted.

FIG. 4 schematically illustrates the underlying problem solved by the inventive method. An unauthorized user 52 is granted access 16 to an electronic resource D 18 stored in a protected data environment 14 of a web application container of a web application server. The electronic resource D is an electronic document and references electronic resources H and G being located on the same hierarchical reference level, whereby electronic resource G further references an electronic resource I being located on a subordinate reference level. In order to allow a non-authenticated user 52 to access document D and to use all shared resources 24 associated with document D that are needed to render document D correctly and furthermore to selectively authorize references from document D to associated reference documents H, G and I, a resource access control method has to be established for controlling such non-authorized user access 16. Therefore, an exception list 32 contains the URI of document D that should be publicly available for non-authenticated users 52. Starting from document D for referencing electronic resources H and G being on the same reference level, a cascading-depth restriction method 40 or a predecessor-successor restriction method 42 as drill down depth restriction method 38 can be used. A drill down depth restriction method 38 in form of a cascading-depth restriction method 40 or a predecessor-successor access method 42 limits the reference navigation path from document D to non-publicly available documents H, G and I and automatically authorizes for use the associated resources 24 for rendering of these documents. For applying a cascading-depth or a predecessor-successor restriction method, One-Time URIs can be used for establishing the referencing. In the example depicted in FIG. 4, the cascading-depth method has a cascading depth of one, i.e. only directly referenced electronic resources H and G can be accessed from document D. Thereby, all references from document D to referenced documents H and G are allowed. No reference from documents G to I is allowed. Starting from document D and using a predecessor-successor restriction method for granting access to the reference path D-G-I, access to electronic resource G via document D and also to reference electronic resource I via resource G. No reference to document H is allowed.

FIG. 5 illustrates a flow chart of a first embodiment of the inventive method. An unauthorized user tries to access an electronic resource "/test.html" stored in a protected data environment via a user access 16. Within an exception list 32 the URIs of all publicly available electronic resources of the protected data environment are listed, so that the URI of the user access can be compared with the URIs stored in the exception list 32 and if the URIs match, an unauthorized user access is granted. Thereby, each resource URI is associated with a cascading-depth numeral 40 determining the allowed reference depth of each accessed electronic resource limiting the scope of the user access. During the next step, an OTU/resource table 36 is created for replacing the URIs of the resources linked or cross-linked with the addressed electronic resource by OTUs (One-Time URLs). The OTU/resource table 36 is then applied to the related document "/test.html", so that in this example the reference from "/test.html" to the electronic picture "/images/pic1.jpg" and "/images/pic2.gif" are replaced by the pre-created OTUs "otu_1.jpg" and "otu_2.gif" 30, 34. After replacing the URLs of "/test.html" (electronic resource) 18 with OTUs, the OTU substituted resource "/test.html" 18 is then delivered to the unauthorized user as OTU substituted resource "/test.html" 46 comprising OTU reference links instead of URL reference links 48, 50.

FIG. 6 shows a flow chart of a first step of a second embodiment of the inventive method and follows basically the scheme of FIG. 5. In exception list 32, a cascading-depth of 1 for access to the electronic resource "/test.html" 18 is defined, which means that not only the directly referenced document "/test.html" 18 can be accessed but also a next level of associated electronic resources can be accessed by the unauthorized user access 16. Therefore, not only OTUs of directly referenced electronic documents of "/test.html", such as images, have to be replaced by OTUs but also references to associated electronic resources of a subordinate electronic resource level. Therefore, in electronic resource "/test.html" 18 not only directly linked URIs to "/images/pic1.jpg" and "/images/pic2.gif" are replaced by OTUs but also a reference to a subordinate electronic resource "/pages/menu.html" is replaced by an "otu_3.html". In such a way, an electronic resource 46 is delivered to the unauthorized user comprising OTUs which reference not only electronic data like pictures and text documents but also an OTU linking to webpage "otu_3.html" as an electronic resource residing on a subordinate reference level.

FIG. 7 illustrates a flow chart of a second step of the second embodiment of the inventive method, wherein OTUs are created in the OTU/resource table 36 replacing URIs 30, 34 of an electronic resource "/test.html" and also of a referenced electronic resource "/pages/menu.html", 18. Thereby, "/test.html" refers to "/images/pic1.jpg" and "/images/pic2.gif" which are replaced by "otu_1.jpg" and "otu_2.gif". The reference from "/test.html" to "/pages/menu.html" is replaced by "otu_3.html" and the references from "/pages/menu.html" to "/images/pic3.jpg" and "/images/pic4.gif" are replaced by "otu_4.jpg", "otu_5.gif" respectively. When the OTU/resource table is applied to the referenced documents, not only all URIs of "/test.html" are replaced by OTUs but also all URIs of "/pages/menu.html" are replaced by the OTUs stored in the OTU/resource table 36. Thus the OTU substituted resource "/test.html" and also the OTU substituted resource "/pages/menu.html" are delivered to the unauthorized user 52.

FIG. 8 illustrates in a pictographic way a schematic representation of electronic resource modifications according to a third embodiment, wherein the substitution process of substituting URIs from "/test.html" (electronic resource) 18, "/pages/menu.html" (electronic resource) 18 and "/pages/settings.html" (electronic resource) 18 of a predecessor-successor relation, whereby all URIs of "/test.html", all URIs of "/pages/menu.html" and some URIs of "pages/settings.html" are replaced by OTUs using the OTU/resource table 36 shown in FIG. 8.

FIG. 9 depicts a flow chart of a fourth embodiment of the inventive method. If a user access request 16 grants access to an electronic resource of a protected data environment, the requested URI is checked if the requested URI is an OTU. If this is the case, then access is granted and an OTU referenced resource is delivered. If the request was based on an OTU, this OTU is deleted from the OTU/resource table, such that the OTU cannot be used for a subsequent access to the referenced document. If the request is based on a URI, which is not an OTU, the URI is checked if the URI grants access to a secured resource residing in a protected data environment. If this is not the case, the resource is delivered. If the URI addresses an electronic resource within a protected data environment, an exception list is asked if the requested URI can be found in the exception list. If this is not the case, a usual authentication process can be started for example a prompt of login and password can be provided for granting a user access to the secured resource. If the URI is listed in the exception list, then a URI/OTU replacement process is started, whereby URIs of the electronic resource are replaced by OTUs and are listed in an OTU/resource table for referencing of the requested resource. In this way, an OTU substituted electronic resource 46 can be delivered to the user.

FIG. 10 displays a flow chart of a fifth embodiment of the inventive method. The embodiment of FIG. 10 differs from the fourth embodiment shown in FIG. 9 in the deletion procedure of a requested OTU from an OTU/Resource Table 36. According to FIG. 9 after delivering of the resource, an additional check is performed if an OTU was requested and in this case the entry of the OTU in the OTU/Resource Table 36 is deleted. The embodiment of FIG. 10 proposes to initially check, if an OTU is requested. If not, a check for a request to a secured resource is performed and in this case an exception list 32 decides whether an OTU/Resource Table 36 should be applied to the requested secured resource or another form of authentication like prompting for login/password is provided. If initially an OTU-resource is requested, the requested OTU is deleted from the OTU/resource Table 36 thus an additional test for an OTU-request like in the fourth embodiment can be omitted. By deleting the requested OTU from the OTU/resource Table 36 the OTU cannot be used for a subsequent access to the requested resource. In this way access is granted only once and an OTU substituted referenced resource is delivered.

The invention claimed is:

1. A resource access control method for controlling a user access through a computer network to an electronic resource stored within a protected data environment of a computer environment, the method comprising:
    defining an exception list comprising a Uniform Resource Identifier (URI), said URI associated with said electronic resource stored within said protected data environment, said URI allowing a non-authenticated user access to said electronic resource;
    defining an allowed access property relation for user access to said electronic resource when accessed by said non-authenticated user;
    checking a URI of a user access request of said non-authenticated user to said electronic resource with a corresponding entry in the exception list;
    creating a One-Time URI and assigning said One-Time URI to said electronic resource according to said allowed access property relation; and
    delivering the requested electronic resource to said non-authenticated user by using the assigned One-Time URI without authenticating said non-authenticated user.

2. The method according to claim 1, wherein the URI from said exception list, the URI of the user access request of the non-authenticated user to the electronic resource, and the One-Time URI each comprise a Uniform Resource Locator (URL).

3. The method according to claim 1, wherein the One-Time URI comprises a One-Time URL (OTU).

4. The method according to claim 1, wherein said computer network is an internet, an intranet, a local area network (LAN) or a wide area network (WAN).

5. The method according to claim 4, wherein said protected data environment is located in a web application container; and wherein said web application container is located in a web application server.

6. The method according to claim 1, wherein an allowed user access is restricted by an authorized drill-down depth restriction of electronic resource access.

7. The method according to claim 6, wherein the drill-down depth restriction follows a cascading-depth restriction method.

8. The method according to claim 6, wherein the drill-down depth restriction follows a predecessor-successor restriction method.

9. The method according to claim 1, wherein the access property relation comprises an allowed read/write access method.

10. The method according to claim 9, wherein the allowed read/write method comprises an http-method of the http-methods "get", "head", "post", "put", "delete", "trace", "connect", and "options".

11. The method according to claim 1, wherein creating and assigning a One-Time URI comprises creating and assigning the One-Time URI to at least one referenced document URI.

12. The method according to claim 11, wherein the at least one referenced document comprises at least one referenced webpage, text or picture of said electronic resource.

13. The method according to claim 1, wherein creating and assigning a One-Time URI comprises creating and assigning of a One-Time URI to at least one referenced software resource URI of said electronic resource.

14. The method according to claim 13, wherein the at least one reference software resource URI comprises at least one reference servlet resource.

15. The method according to claim 1, wherein creating and assigning said One-Time URI comprises creating and assigning said One-Time URI to at least one referenced email URI of said electronic resource.

16. The method according claim 1, wherein said one One-Time URI is only valid for a One-Time user access.

* * * * *